United States Patent [19]

Hehl

[11] 4,435,991
[45] Mar. 13, 1984

[54] POTENTIOMETER DRIVE FOR DISPLACEMENT TRANSDUCER OF RECIPROCATING UNIT

[76] Inventor: Karl Hehl, Arthur-Hehl-Strasse 32, 7298 Lossburg 1, Fed. Rep. of Germany

[21] Appl. No.: 255,730

[22] Filed: Apr. 20, 1981

[30] Foreign Application Priority Data

Apr. 18, 1980 [DE] Fed. Rep. of Germany ....... 3014903

[51] Int. Cl.³ .............................................. F16H 27/02
[52] U.S. Cl. ........................................ 74/89.2; 74/10.7
[58] Field of Search ............................... 74/89.2, 10.7; 248/27.1; 338/197, 199; 403/371

[56] References Cited

U.S. PATENT DOCUMENTS

| | | | |
|---|---|---|---|
| 2,492,286 | 12/1949 | Hermann | 338/197 |
| 2,654,641 | 10/1953 | Veatch | 338/197 |
| 4,051,916 | 10/1977 | Oda | 248/27.1 |
| 4,287,785 | 9/1981 | Hunt | 403/371 |
| 4,290,317 | 9/1981 | Hehl | 474/257 |

Primary Examiner—William F. Pate, III
Attorney, Agent, or Firm—Joseph A. Geiger

[57] ABSTRACT

A potentiometer drive for the displacement transducer of a reciprocating unit which uses a timing belt to drive the rotary potentiometer and where one belt pulley serves as a control disc to which the drive shaft of the rotary potentiometer is coupled in a direct rigid connection. The coupling connection is obtained by means of a coupling collet which clamps the end portion of the potentiometer drive shaft to a hollow hub of control disc and the latter to the inner races of two ball bearings. The potentiometer housing is blocked against rotation in a "floating" configuration, using a radial pin on the housing which engages a stationary retaining fork in such a way that only circumferential antirotation forces are transmittable to the potentiometer housing.

14 Claims, 10 Drawing Figures

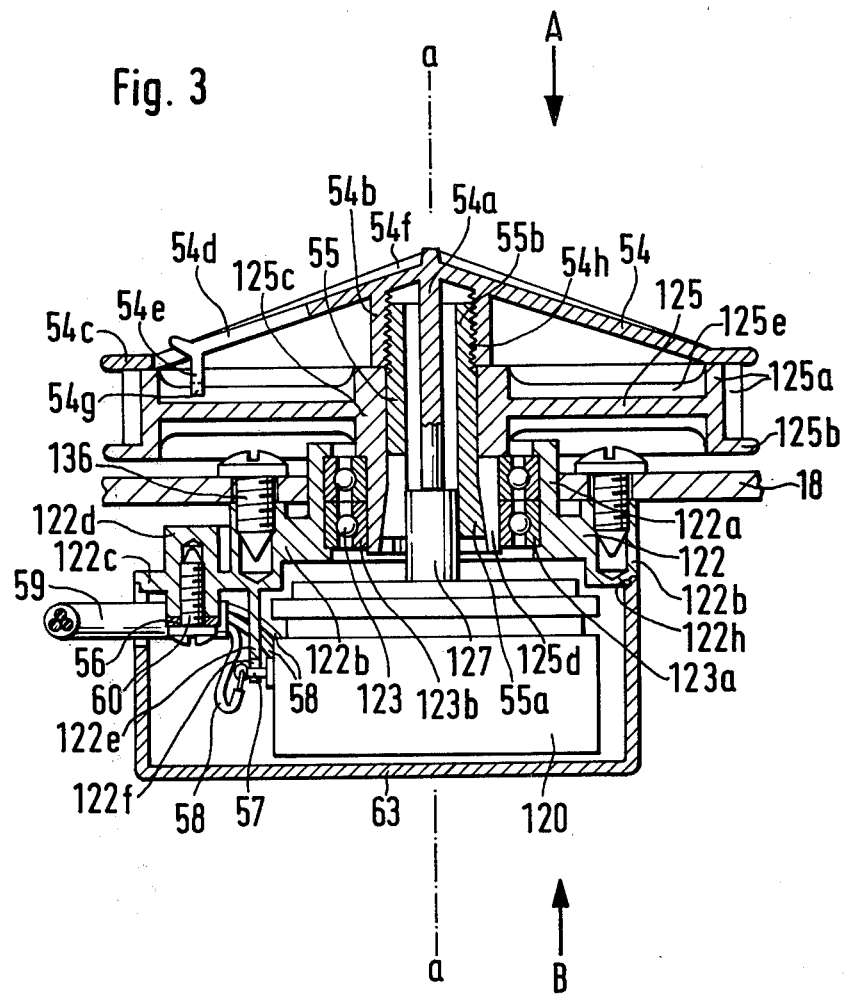

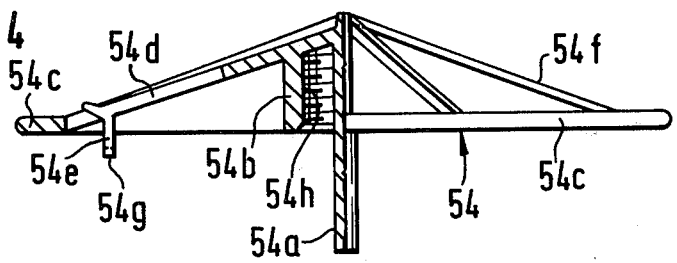
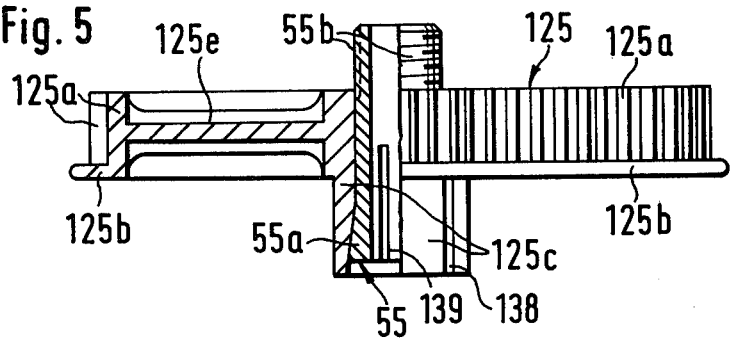
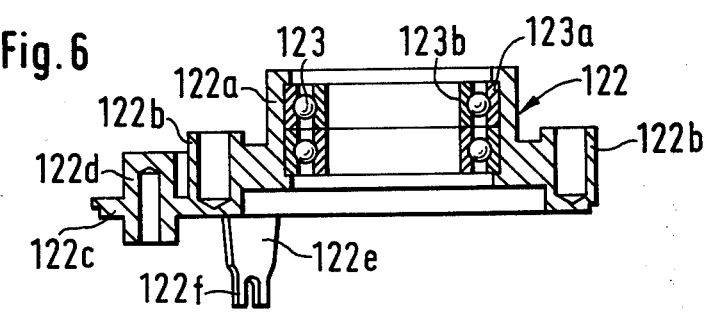
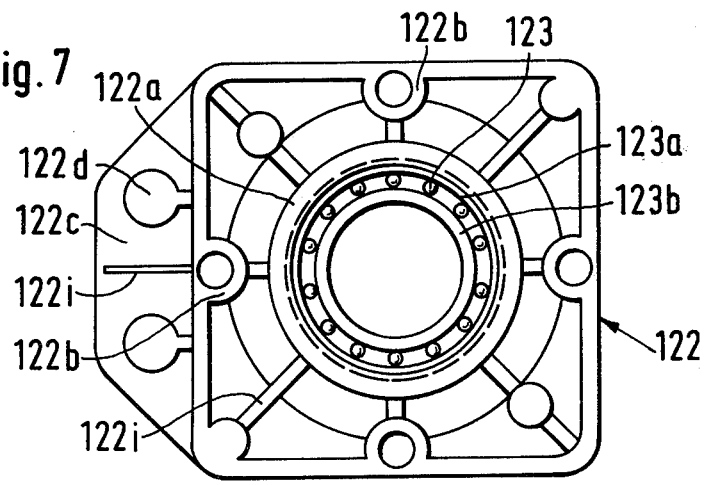

POTENTIOMETER DRIVE FOR DISPLACEMENT TRANSDUCER OF RECIPROCATING UNIT

BACKGROUND OF THE INVENTION

1. Field of the Invention

The present invention relates to control devices for repetitive limit switching in connection with a lineally reciprocating device, and, more particularly, to a displacement transducer for such a reciprocating device which utilizes a rotary potentiometer to produce a switching signal value of high accuracy, as required in connection with injection molding machines, for example.

2. Description of the Prior Art

The present invention is related to a device disclosed in my U.S. Pat. No. 4,290,317 which features a precision drive for a rotary potentiometer to measure the lineal displacements of a reciprocating machine unit, such as the injection movement of the plastification screw of the injection unit in an injection molding machine. It is very important for this displacement-transducing action to be of utmost precision and consistency, because the resultant switching signal determines the quantity of plastic material which is injected into the injection molding die of the machine, thus affecting the quality of the injection-molded parts.

In my prior disclosure, I have suggested the arrangement of a timing belt loop alongside the injection unit in such a way that the relative axial displacement between the plastification cylinder and the plastification screw is transmitted to a parallel-oriented run of the timing belt. The lineal movement of the latter is thereby translated into an angular movement of the belt pulleys, one of which serves as a control disc, in a direct drive connection with a rotary potentiometer. Accordingly, the angular position of the potentiometer wiper and the resulting signal output are accurate indicators of the displacement position of the plastification screw. A screw-type injection unit normally has two parallel tie rods which carry a first bridge assembly with a central plastification cylinder on the forward side of the unit and a second bridge assembly with the plastification screw and a hydraulic screw drive on the rear side of the unit, one or two hydraulic cylinders producing the injection stroke by approaching the two bridge assemblies.

It has now been found that, while it is necessary to directly couple the control disc of the timing belt loop to the rotary potentiometer for a backlash-free angular connection, a rigid connection between the potentiometer drive shaft and the hub of the control disc can produce undesirable side effects in the bearings of the potentiometer drive shaft, if the potentiometer is mounted in a normal, fixed arrangement on the supporting structure. The potential problems include a reduced longevity of the potentiometer, with less than optimal measurement accuracy, and assembly problems that lead to further inaccuracies, if the potentiometer is removed and reinstalled, for any reason.

SUMMARY OF THE INVENTION

Underlying the present invention is the objective of suggesting an improvement over the above-described prior art potentiometer drive by which the previously encountered wear condition is substantially reduced and the longevity in terms of operational accuracy of the device is extended accordingly.

The present invention proposes to attain this objective by suggesting a drive configuration in which the connection between the control disc of the belt drive and the rotary potentiometer includes means for releasably clamping the potentiometer drive shaft to the control disc to produce a rigid attachment, and means for blocking the potentiometer housing against rotation in such a way that only a circumferential holding force is transmitted to the housing while the weight of the potentiometer is carried by the potentiometer shaft and by the connected control disc. Comparative tests have established that the longevity of the rotary potentiometer is greatly increased by such a connection, up to several million operating cycles.

The novel drive connection has the advantage of allowing for small oscillatory correction movements between the potentiometer housing and the stationary part which provides the antirotation blocking force. It also eliminates any potential misalignment which can result from the previously rigid attachment of the potentiometer housing. The proposed "floating" arrangement of the potentiometer housing assures that the delicate ball bearings which support the potentiometer drive shaft inside the potentiometer housing are not subjected to any load other than the weight of the potentiometer housing, thereby reducing the internal wear and any consequent misalignment of the potentiometer wiper to an absolute minimum.

In a preferred embodiment, the present invention further suggests that the rotation blocking means for the potentiometer housing be provided in the form of an electrical lead pin which extends radially from the potentiometer housing and is engaged by a stationary retaining fork which allows for small radial axial displacements between the lead pin and the retaining fork while providing a circumferentially clearance-free engagement. A suitable cable clamp relieves the electrical connections between the cable conductors and the potentiometer housing from any forces that may be applied to the connecting cable.

In the disclosed preferred embodiment, the invention further suggests that the rigid connection between the control disc and the potentiometer drive shaft be accomplished with the aid of a coupling collet which is arranged inside the hollow hub of the control disc and surrounds the protruding portion of the potentiometer drive shaft in the manner of a tool collet. By arranging appropriate longitudinal slots not only in the coupling collet, but also in the surrounding tapered hollow hub, the latter becomes expandable in the radial sense, so as to provide an additional radial clamping action between the hollow hub and the ball bearings which support the control disc in the bottom wall of the guard case supporting and enclosing the belt drive.

A clamping disc on the outer side of the control disc serves as a hand-rotatable tightening member for the coupling collet. An integral ratchet blade on the clamping disc cooperates with radial ridges on the control disc to provide a ratchet action between the clamping disc and the control disc. Appropriate markings assure that identical clamping conditions can be reestablished, after disassembly of the potentiometer drive connection. A positioning pin which extends axially from the clamping disc into the bore of the coupling collet and abuts against the potentiometer drive shaft produces a predetermined axial position of the potentiometer in relation to the control disc.

BRIEF DESCRIPTION OF THE DRAWINGS

Further special features and advantages of the invention will become apparent from the description following below, when taken together with the accompanying drawings which illustrate, by way of example, an embodiment of the invention represented in the various figures as follows:

FIG. 1 is a partial elevational view of an injection unit of an injection molding machine which is equipped with a displacement transducer utilizing a rotary potentiometer driven by a timing belt, the protective cover of the timing belt guard case having been removed;

FIG. 3 is an enlarged transverse cross section through a potentiometer drive assembly embodying the present invention;

FIG. 4 shows a partially cross-sectioned clamping disc, as part of the assembly of FIG. 3;

FIG. 5 shows a partially cross-sectioned control disc and a cooperating coupling collet, as part of the assembly of FIG. 3;

FIG. 6 shows a cross-sectioned bearing flange, as part of the assembly of FIG. 3;

FIG. 7 shows the bearing flange of FIG. 6 in a plan view, as seen in direction A of FIG. 3;

DESCRIPTION OF THE PREFERRED EMBODIMENTS

Figure 2:
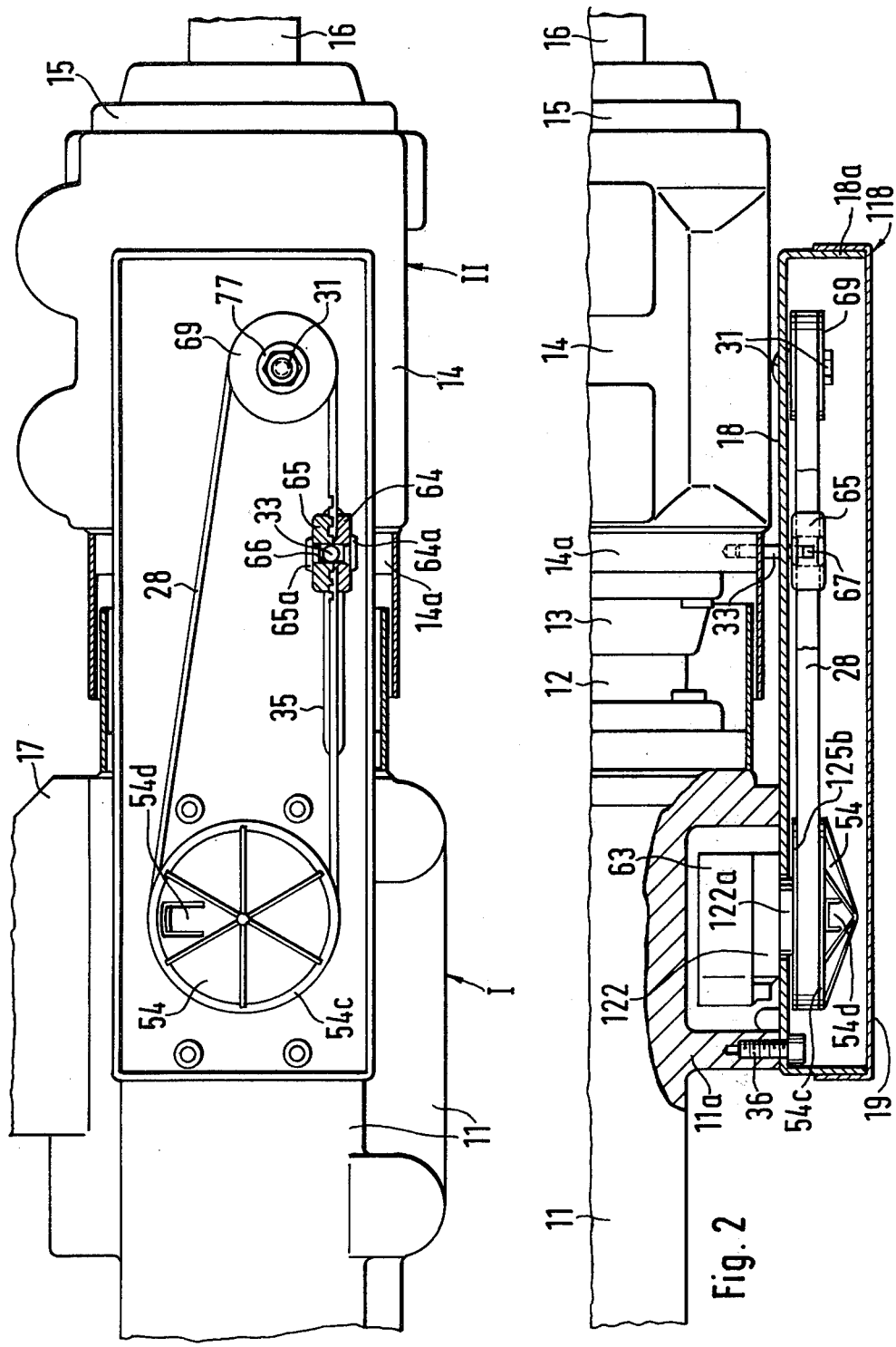
FIG. 2 shows the injection unit of FIG. 1 in a plan view, the guard case and portions of the injection unit itself being shown transversely cross sectioned.

FIGS. 1 and 2 show portions of a known injection unit of an injection molding machine, as an example of an advantageous application of the present invention. A complete injection unit of this type is disclosed in my U.S. Pat. No. 3,833,204. The device of the invention, as applied to this injection unit, serves as part of a displacement transducer which translates the lineal displacements of a first assembly in relation to a second assembly of the injection unit into precise measurements in the form of a continuous electrical signal, using a rotary potentiometer to produce this signal. This makes it possible to achieve accurate repetitive limit switching, in combination with a convenient continuous adjustability of the end points of displacement of the moving assembly.

In the drawing, the two assemblies of the injection unit are designated as assembly I and assembly II. Both assemblies are supported and longitudinally guided on two parallel stationary guide rods 16. The assembly I consists essentially of a bridge-like carrier 11 straddling the two guide rods 16 and supporting in the center axis of the injection unit a plastification cylinder, in parallel alignment with the guide rods 16. The assembly II has a similar bridge-like carrier straddling the guide rods 16 and enclosing a length portion of each rod with a drive housing 14, as part of a hydraulic linear actuator. In the center axis of the unit, the assembly II carries a hydraulic rotary drive to which is connected a plastification screw which extends into the plastification cylinder, being rotatable therein and movable longitudinally through movements of the assembly II in relation to the assembly I.

During the plastification portion of the injection cycle, the plastification screw rotates while being pushed rearwardly, as raw material accumulates inside the plastification cylinder. At a certain point, this rearward movement of the assembly II is reversed into an injection stroke in which the plastification screw is pushed into the plastification cylinder, injecting the plastified raw material into the injection molding die, through a nozzle in the forward extremity of the plastification cylinder. The reciprocating movements of assembly II in relation to assembly I are produced by the hydraulic linear actuators which are arranged inside the drive housing 14 on the guide rods 16. FIG. 2 shows piston sleeves 12 as part of these actuators and front and rear covers 13 and 15 of the drive housing 14. The entire injection unit is also movable longitudinally by means of a pair of hydraulic actuators which are arranged between the assembly I and the guide rods 16. A mounting base 17 on the upper side of assembly I (FIG. 1) serves as a support for a granulate hopper from which the raw material is fed into the plastification cylinder.

As can be seen in FIG. 2, the carrier 11 of the assembly I has arranged on its longitudinal side a pot-shaped housing protrusion 11a inside which is mounted a rotary potentiometer 120 (FIG. 3), supported by a bearing flange 122 and protected by a housing cover 63. The bearing flange 122 also supports a rotatable control disc 125 which is directly connected to the wiper of the rotary potentiometer 120, as will be described in more detail further below. Carrying the rotatable assembly of the control disc 125 and connected potentiometer 120 is the bottom wall 18 of a generally rectangular guard case 118 which is bolted to a flat end face of the housing protrusion 11a, thereby also serving as a cover for the latter. The guard case 118 extends rearwardly alongside the injection unit, into the movement range of the reciprocating assembly II, where it supports a return guide roller 69. The bearing 77 for the return guide roller 69 is seated on a threaded journal bolt 31. A slot in the bottom wall 18 gives the roller 69 a longitudinal adjustability, so that it will also serve as a belt tightening member.

A timing belt 28 forms a loop around the control disc 125 and the return guide roller 69. The control disc 125 and the return guide roller 69 are so arranged that the bottom run of the timing belt 28 extends parallel to the guide rods 16. The entire timing belt loop is enclosed within the guard case 118, under a removable cover 19 which engages an upstanding circumferential side wall 18a. On the lower run of the timing belt is arranged a follower clamp 65, 65 which also serves as a belt buckle by joining the two cut ends of the timing belt 28 into an endless belt loop. The belt buckle consists of injection-molded lower and upper buckle jaws 64 and 65, respectively, which have lateral reinforcing shoulders 64a and 65a and are snapped together by means of four hooks on the lower buckle jaw 64 which engage appropriate recesses on the upper buckle jaw 65. A vertical central opening 66 intersects a transverse central opening 67. Into the latter is tightly fitted a follower pin 33 which extends laterally from a flange portion 14a of the drive housing 14 of assembly II.

By thus combining the belt follower with a belt buckle, it is possible to arrange the follower connection in the exact line of force of the timing belt 28. The vertical opening 66 in the belt buckle makes it possible to arrange the follower pin 33 in a vertical orientation, as may be required for a different machine configuration. The follower pin 33 extends into the guard case 118 through an appropriate slot 35 in its bottom wall 18. The longitudinal extent of this slot is such that it accommodates the maximum adjustable stroke of the moveable assembly II.

In FIG. 3, it can be seen that the control disc 125 is directly coupled to the rotary potentiometer 120. The latter is of the type which has a homogeneous resistance track of slightly less than 360° angular extent, against which rubs a rotatable potentiometer wiper which is attached to the potentiometer drive shaft 127. As the movable assembly II executes a longitudinal movement, the lower run of the timing belt 28 is made to follow the same movement, thereby rotating the control disc 125 and the connected potentiometer wiper over a corresponding angle on the arcuate resistance track in the potentiometer housing. The angle at which the wiper contacts the resistance track is reflected by a corresponding specific resistance level of the potentiometer which, when an electrical potential is applied to it, produces a corresponding precise signal current. At a predetermined level of this signal current, it triggers a switching action which stops and/or reverses the hydraulic pressure in the linear actuators that drive the movable assembly II.

Such a motion transducer is ideally suited for a machine which requires a very large number of accurate repetitive switching actions and a convenient continuous adjustability of the trigger point, or points, at which the switching action is to take place. A conventional electronic trigger circuit provides this adjustability.

The connection between the potentiometer drive shaft 127 and the control disc 125 is obtained by means of a direct shaft coupling which creates a rigid connection between these parts. Such a rigid connection, however, requires that the potentiometer 120 be arranged in a "floating" configuration in which it is blocked against rotation while being free to assume its position as determined by its attachment to the control disc 125 and the bearing support for the latter. Accordingly, if there is any misalignment or eccentricity present in the hollow hub 125c or in the shaft coupling, or if a clearance is present in the bearing support of the control disc 125, the potentiometer 120 is free to execute the imposed slight oscillatory movement, or it may shift in a radial or axial sense at its point of rotational retention, without thereby creating any additional forces on the highly sensitive ball bearings of the potentiometer drive shaft 127. By thusly protecting the potentiometer bearings, the operational accuracy and longevity of the device are extended to their maximum.

The rotational assembly of FIG. 3, consisting of the control disc 125 and of the attached rotary potentiometer 120, is supported on the bottom wall 18 of the guard case 118 (FIG. 2) by means of a bearing flange 122 which is centered in a bore of the wall 18 and clamped against the back side of the latter by means of screws 136. Seated in the central bore of the bearing flange 122 are two adjoining ball bearings 123 of which the outer races 123a are preferably molded directly into the bearing flange 122. The inner races 123b of the ball bearings 123 are seated on the hollow hub 125c which extends through the wall 18 into the immediate vicinity of the rotary potentiometer 120. The latter has its drive shaft 127 axially aligned with the hollow hub 125c and reaching a distance into this hub, so as to form an annular space which is occupied by an axially movable coupling collet 55. The bore of the hollow hub 125c and the coupling collet 55 have matching outwardly widening tapers. The coupling collet 55 has four longitudinal slots 139 (FIG. 5) which extend a distance beyond the length of the taper, thus forming four radially flexible coupling tongues 55a on the collet 55. Similarly, the hollow hub 125c has four longitudinal slots 138 forming four flexible clamping sectors 125d. By pulling the coupling collet 55 in the axial direction into the hollow hub 125c, its coupling sectors 55a act as radial wedges, clamping the potentiometer drive shaft 127 to the hollow hub 125c and simultaneously forcing the clamping sectors 125d of the latter into clamping engagement with the inner races 123b of the ball bearings 123. The result is a rigid rotatable assembly which is journalled in the ball bearings 123.

Producing the clamping action of the coupling collet 55 is a clamping disc 54 which is arranged on the outer side of the control disc 125, engaging an externally threaded protruding end portion 55b of the coupling collet 55 with an internally threaded hub portion 54b while abutting against a planar face of the control disc 125. A clockwise rotation of the clamping disc 54 thus produces a clamping action by pulling the coupling collet 55 into the hollow hub 125c. A positioning pin 55a in the form of an integral central extension of the clamping disc 54 reaches axially into the center bore of the coupling collet 55 and into abutment contact with an end face of the potentiometer drive shaft 127, thereby determining the axial position of the potentiometer 120 by restraining its drive shaft 127 against axial displacement, as the coupling collet 55 is pulled into the hollow hub 125c of the control disc 125.

The control disc 125 is of such a diameter that a maximum displacement of the assembly II produces less than a full rotation of the control disc 125, in correspondence with the maximum angular movement range of the potentiometer wiper. The clamping disc 54 is so arranged that it cooperates with the control disc 125 to form a belt-guiding flange for the latter, having a peripheral collar 54c of the same outer diameter as the flange collar 125b of the control disc 125, and thereby simplifying the manufacture of the toothed rim 125a (FIG. 5) which is engaged by the timing belt 28.

Figure 8:
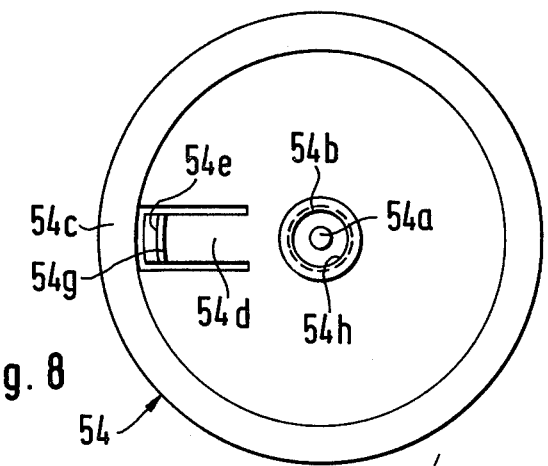
FIG. 8 is a plan view of the clamping disc of FIG. 4, as seen in direction B of FIG. 3.
Figure 9:
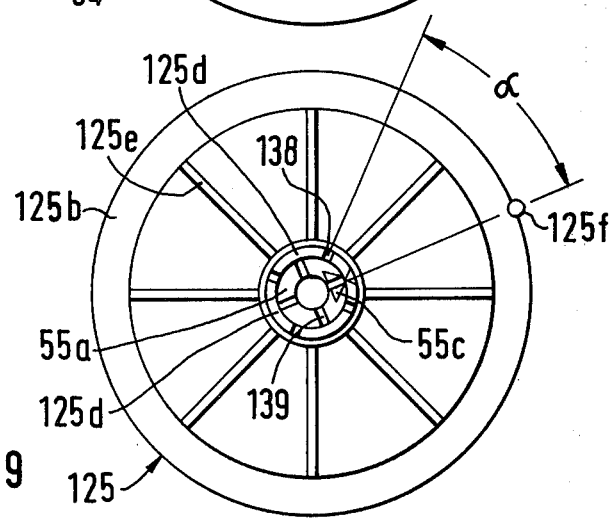
FIG. 9 is a plan view of the control disc of the assembly of FIG. 3, as seen in direction B of FIG. 3.
Figure 10:
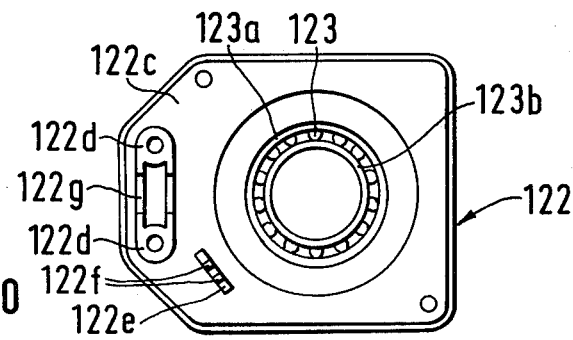
FIG. 10 shows the bearing collar of FIGS. 6 and 7, as seen in direction B of FIG. 3.

As can be seen in FIGS. 3 and 8, the clamping disc 54 has a portion of its dish-shaped wall surrounded by a slot so as to define a tongue-shaped flexible ratchet blade 54d with a ratchet catch 54e on its radially distal flexing extremity, the catch 54e extending in the axial direction, into engagement with the control disc 125 which, for this purpose, has a series of angularly regularly spaced radial ridges 125e which serve as ratchet teeth (FIG. 9). The ratchet catch 54e of the blade 54d has an inclined cam face 54g which is so arranged that, when the clamping disc 54 is rotated in the clockwise direction, i.e. tightened, the ratchet catch 54e is lifted over the radial ridges 125e, while retaining the clamping disc 54 against counterclockwise rotation. Only when the ratchet catch 54e is forcibly lifted, can the clamping disc 54 be rotated counterclockwise, for a release of the coupling collet 55.

The "floating" retention of the potentiometer housing against rotation is accomplished by means of a pin 55 which extends radially from the potentiometer housing and a cooperating stationary retaining fork 122e which engages the pin 57 in such a way that only circumferentially oriented antirotation forces are transmittable to the potentiometer housing. This is the case, when the two opposing points of contact between the two members of the blocking means are located on a common circle around the axis of the potentiometer drive shaft 127. For this purpose, the retaining fork 122e has two tines 122f which form contact surfaces that are equidistant from and parallel to a plane through the axis of the potentiometer drive shaft 127. Such an arrangement makes it possible for the pin 57 to move axially as well as radially in relation to the retaining fork 122e, while being restrained in the circumferential, i.e. rotational, sense of the potentiometer.

The retaining fork 122e is preferably an integral extension of the bearing flange 122, and the pin 57 may be an electrical lead pin, as is suggested in FIG. 3. In order to further protect the potentiometer against any exterior forces that might be applied to its housing through its electrical connections, the bearing flange 122 has two bosses 122d which form a cord cradle 122g against which the electrical connecting cable 59 is clamped by means of a cable clamp 56 and screws 60. A cover 63 encloses the potentiometer 120.

It has been found that for a clamping connection of maximum rigidity between the potentiometer drive shaft 127 and the hollow hub 125c of the control disc, it is advisable to set the coupling collet 55 in such a way that its four slots 139 (FIG. 5) are angularly offset from the four slots 138 of the hollow hub 125c by an angle of approximately 45°, as can be seen in FIG. 9. This alignment is facilitated by appropriate alignment markings on the end faces of the coupling collet 55 and of the hollow hub 125c. By maintaining the proper position with the aid of these markings, it is also possible to obtain a repeatable clamping condition between the coupling collet 55 and the clamping disc 54, a feature which is important, when the potentiometer is to be removed and later reattached to the control disc 125. This is made possible by providing on the periphery of the control disc 125 a protruding nose 125f (FIG. 9) or some other suitable marking, the position of which in relation to the ratchet blade 54d is ascertained, before the coupling collet 55 is released by lifting the ratchet catch 54e and turning the clamping disc 54 in the counterclockwise direction.

It should be understood, of course, that the foregoing disclosure describes only a preferred embodiment of the invention and that it is intended to cover all changes and modifications of this example of the invention which fall within the scope of the appended claims.

I claim the following:

1. A backlash-free drive connection between a rotatable control disc and a rotary potentiometer comprising in combination:
   a mounting wall extending substantially perpendicularly to the rotational axis of the control disc;
   a journal support rotably supporting the control disc in the mounting wall;
   means for releasably clamping the potentiometer drive shaft to the control disc in such a way that they form a rigid rotatable assembly; and
   means for blocking the potentiometer housing against rotation relative to the mounting wall in such a way that only circumferentially oriented antirotation forces are transmittable from the mounting wall to the potentiometer housing and the weight of the potentiometer is carried entirely by the potentiometer shaft and the connected control disc.

2. A drive connection as defined in claim 1, wherein
   the rotation blocking means is defined by an axially extending retaining member which is solidary with the mounting wall and a cooperating radially extending member on the potentiometer housing;
   one of the two cooperating members is received between two opposite contact points of the other member substantially without clearance, the contact points being located on a common circle about the axis of the potentiometer shaft; and
   one of the two members has parallel opposite contact surfaces surrounding the contact points, the contact surfaces being equidistant from and parallel to the plane through the axis of the potentiometer shaft.

3. A drive connection as defined in claim 2, wherein
   the axially extending retaining member is a retaining fork with a slot separating two tines that define the parellel opposite contact surfaces; and
   the radially extending member on the potentiometer housing is a radially extending pin fitting between the tines of the retaining fork.

4. A drive connection as defined in claim 2, further including
   a bearing flange attached to the mounting wall, the bearing flange having a centering collar with a bearing serving as the journal support for the rotatable control disc; and wherein
   the axially extending retaining member is a part of the bearing flange; and
   the bearing flange includes a cable clamp for a connecting cable which leads to the potentiometer.

5. A drive connection as defined in any one of claims 1 through 4, wherein
   the potentiometer drive shaft has an end portion which protrudes axially from the potentiometer housing;
   the rotatable control disc has a hollow hub protruding axially in the direction of the potentiometer and surrounding the end portion of the latter so as to define an annular gap therewith;
   the drive shaft clamping means includes a coupling collet occupying said annular gap; and
   the coupling collet has a plurality of axially oriented slots defining radially yielding coupling tongues at one end of the collet, the coupling tongues having a tapered outline so that, when the coupling collet is moved axially, its tapered coupling tongues act as wedges, creating a radial clamping action between the potentiometer drive shaft and the hollow hub of the control disc.

6. A drive connection as defined in claim 5, wherein
   the hollow hub of the control disc has an end portion with a cylindrical outer surface carrying thereon the inner race of an antifriction bearing;
   the hollow hub further has in said end portion an outwardly tapering bore portion which cooperates with matchingly tapered outer surface portions of the coupling tongues of the coupling collet, the tapered outline of the latter being the result of said tapered surface portions; and
   the coupling collet has a cylindrical bore portion with which it receives a matching cylindrical outer surface of the drive shaft end portion.

7. A drive connection as defined in claim 6, wherein
   the hollow hub of the control disc has likewise a plurality of axially oriented slots defining radially yielding clamping sectors at the protruding end of the hub so that, when the coupling collet is moved axially away from the potentiometer, it not only creates said radial clamping action between the potentiometer drive shaft and the hub of the control disc, but also a radial clamping action between the hub and the inner race of the antifriction bearing which is seated on it; and the slots of the hollow hub are angularly offset from the slots of the coupling collet.

8. A drive connection as defined in claim 5, further comprising a clamping disc with an internally threaded hub portion engaging an externally threaded protruding end portion of the coupling collet opposite its coupling tongues; and an abutment surface on the control disc surrounding a control disc bore from which the threaded collet end portion protrudes, the abutment surface being engaged by an end face of the hub portion of the clamping disc, thereby making it possible to tighten the coupling collet by rotating the clamping disc in relation to the control disc; and wherein the clamping disc and the control disc define between them means for angularly securing the clamping disc in relation to the control disc.

9. A drive connection as defined in claim 8, wherein the clamping disc securing means includes a manually releasable ratchet means which allows for a rotational tightening advance of the clamping disc, while securing the latter in the opposite rotational sense; and the teeth of the ratchet means are in the form of radially oriented ridges on the control disc.

10. A drive connection as defined in claim 9, wherein the clamping disc includes a radially extending flexible ratchet blade with a ratchet catch on its distal extremity; and the ratchet catch is in the form of an angled-off integral extension of the ratchet blade, having an inclined cam surface facing against the radial ridges of the control disc, so that in the tightening direction of rotation of the clamping disc, the ratchet catch rides up on and over the radial ridges of the control disc.

11. A drive connection as defined in claim 9, wherein the hub of the control disc and the coupling collet include markings for the setting of a predetermined angular alignment between the coupling collet and the hub; and the clamping disc and the control disc include markings for the setting of a predetermined tightening condition of the coupling collet.

12. A drive connection as defined in claim 8, wherein the coupling collet has an axial throughbore; and the clamping disc and the drive shaft of the potentiometer define potentiometer positioning means in the form of a spacer member which is arranged in the collet bore, axially between the potentiometer drive shaft and the clamping disc.

13. A drive connection as defined in claim 12, wherein the spacer member is a positioning pin in the form of an integral extension of the clamping disc.

14. A drive connection as defined in claim 8, wherein the control disc has a toothed periphery in the shape of a timing belt pulley with a belt-retaining flange on one axial side thereof; and the clamping disc has substantially the same outer diameter as the control disc, a peripheral portion of the clamping disc serving as a timing belt retaining flange on the other axial side thereof.

* * * * *